United States Patent
Su et al.

(10) Patent No.: US 8,300,371 B2
(45) Date of Patent: Oct. 30, 2012

(54) ELECTROSTATIC DISCHARGE PROTECTION CIRCUIT AND ELECTRONIC DEVICE USING THE SAME

(75) Inventors: Xian-Jun Su, Shenzhen (CN); Ching-Chung Lin, Miao-Li County (TW)

(73) Assignees: Innocom Technology (Shenzhen) Co., Ltd., Shenzhen (CN); Chimei Innolux Corporation, Miao-Li County (TW)

( * ) Notice: Subject to any disclaimer, the term of this patent is extended or adjusted under 35 U.S.C. 154(b) by 394 days.

(21) Appl. No.: 12/763,152

(22) Filed: Apr. 19, 2010

(65) Prior Publication Data
US 2011/0069419 A1    Mar. 24, 2011

(30) Foreign Application Priority Data
Sep. 21, 2009 (CN) .......................... 2009 1 0307371

(51) Int. Cl.
*H02H 9/00* (2006.01)

(52) U.S. Cl. ......................................................... 361/56
(58) Field of Classification Search ..................... 361/56
See application file for complete search history.

(56) References Cited

U.S. PATENT DOCUMENTS

| | | | | |
|---|---|---|---|---|
| 5,545,909 | A * | 8/1996 | Williams et al. .............. | 257/355 |
| 7,242,564 | B2 * | 7/2007 | Lin ................................. | 361/103 |
| 7,463,466 | B2 * | 12/2008 | Hsueh et al. .................... | 361/56 |
| 7,579,632 | B2 * | 8/2009 | Salih et al. ..................... | 257/173 |

* cited by examiner

*Primary Examiner* — Stephen W Jackson
(74) *Attorney, Agent, or Firm* — WPAT., PC; Justin King

(57) ABSTRACT

An electrostatic discharge protection circuit includes an input terminal, a first diode, a second diode, a third diode, a fourth diode, a plurality of voltage stabilizer circuits, and a power terminal. The input terminal and the cathode of the second diode connect to the anode of the first diode; the voltage stabilizer circuits connect in parallel between the cathode of the first diode and the anode of the second diode. The power terminal connects to the anode of the third diode, the cathode of the third diode connects to the cathode of the first diode. The cathode of the fourth diode connects to ground, the anode of the fourth diode connects to the anode of the second diode.

15 Claims, 4 Drawing Sheets

ELECTROSTATIC DISCHARGE PROTECTION CIRCUIT AND ELECTRONIC DEVICE USING THE SAME

BACKGROUND

1. Technical Field

The present disclosure relates to an electrostatic discharge (ESD) protection circuit for eliminating static electricity and an electronic device using the same.

2. Description of Related Art

ESD is a well-known phenomenon, which causes damage to electronic devices such as liquid crystal displays (LCDs) and televisions, for example. To avoid damaging a circuit by ESD, an ESD protection circuit is required.

Referring to FIG. 4, one such ESD protection circuit 1 used for LCDs includes a first diode 10, a second diode 12, and a capacitor 14. Each diode includes an anode and a cathode. The first diode 10 and the second diode 12 connect in series, and the capacitor 14 connects in parallel with the first diode 10 and the second diode 12. The anode of the first diode 10 electrically connects to ground 3; the cathode of the first diode 10 electrically connects to the anode of the second diode 12. The cathode of the second diode 12 electrically connects to a power terminal 2. A power voltage VCC inputs to the ESD protection circuit 1 through the power terminal 2.

Usually, the first diode 10 and the second diode 12 are reverse biased. If a negative electrostatic voltage inputs to the ESD protection circuit 1 through a line 16, the first diode 10 is forward biased, the voltage of the wire 16 goes to ground. If a positive electrostatic voltage, which is greater than the power voltage VCC inputs to the ESD protection circuit 1 through the wire 16, the second diode 12 is forward biased; the voltage of the wire 16 goes to the power voltage VCC. The capacitor 14 filters the positive electrostatic voltage.

However, if the absolute value of the electrostatic voltage is too great, the first diode 10, and the second diode 12 burn out easily, so the ESD protection circuit 1 cannot work normally.

What is needed is to provide an ESD protection circuit and an electric device using the same that can overcome the above-described deficiencies.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present ESD protection circuit and electric device using the same.

DETAILED DESCRIPTION

Reference is now made to the drawings to describe various embodiments of the present disclosure in detail.

Figure 1:
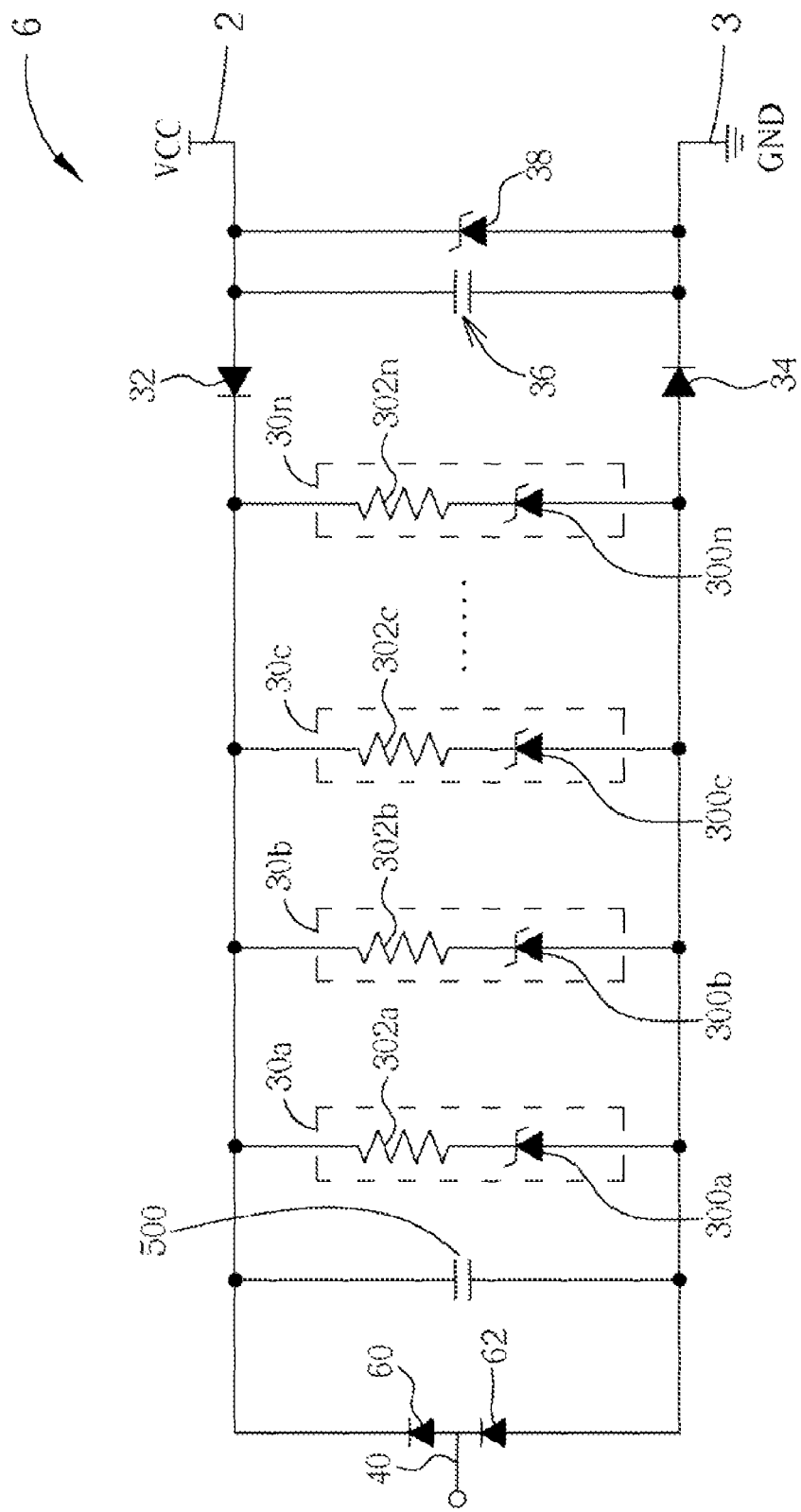
FIG. 1 is a schematic circuit diagram of an ESD protection circuit according to a first embodiment of the present disclosure.

Referring to FIG. 1, an ESD protection circuit 6, according to a first embodiment of the present disclosure, includes an input terminal 40, a first diode 60, a second diode 62, a capacitor 500, a plurality of voltage stabilizer circuits 30$i$ (i=a, b, c, . . . , n), a third diode 32, a fourth diode 34, a bypass capacitor 36, a zener diode 38, the power terminal 2 and the ground 3. Each diode includes an anode and a cathode. Each voltage stabilizer circuit 30$i$, includes a voltage stabilizing diode 300$i$ (i=a, b, c, . . . , n) and a resistor 302$i$ (i=a, b, c, . . . , n), which is in series with the voltage stabilizing diode 300$i$. The voltage stabilizer circuits 30$i$ electrically connect in parallel between the cathode of the first diode 60 and the anode of the second diode 62. The voltage stabilizing diode 300$i$ is a zener diode. A power voltage VCC inputs to the ESD protection circuit 6 through the power terminal 2.

The input terminal 40 electrically connects to the anode of the first diode 60, the cathode of the first diode 60 electrically connects to the cathode of the third diode 32. The anode of the third diode 32 electrically connects to the power terminal 2. The cathode of the second diode 62 electrically connects to the anode of the first diode 60. The anode of the second diode 62 electrically connects to the anode of the fourth diode 34. The cathode of the fourth diode 34 electrically connects to the ground 3. The bypass capacitor 36 and the zener diode 38 electrically connect in parallel between the power terminal 2 and the ground 3.

According to the voltage stabilizing diode 300$i$, each voltage stabilizer circuit 30$i$ has a regulated voltage value $V_i$ (i=1, 2, 3 . . . n), and the magnitude relationship of the regulated voltage values $V_1 \sim V_n$ is $V_1<V_2<\ldots<V_n$. The power voltage VCC is less than $V_1$.

If an positive electrostatic voltage inputs to the ESD protection circuit 6 through the input terminal 40, the working process of the ESD protection circuit 6 may include the following steps (the voltage drop of all diodes are ignored for simplification):

In a first stage: if the positive electrostatic voltage is less than VCC, the ESD protection circuit 6 does not work.

In a second stage: if the positive electrostatic voltage is greater than VCC and less than $V_1$, the first diode 60 and the fourth diode 34 are forward biased, the second diode 62 and the third diode 32 are reverse biased. The positive electrostatic voltage charges the capacitor 500. The capacitor 500 absorbs electrostatic energy of the positive electrostatic voltage.

In a third stage: if the positive electrostatic voltage is greater than $V_1$ and less than $V_2$, the first diode 60 and the fourth diode 34 are forward biased, the second diode 62 and the third diode 32 are reverse biased. The voltage stabilizing diode 300$a$ is biased into reverse breakdown. The input terminal 40, the first diode 60, the voltage stabilizer circuit 30$a$, the fourth diode 34, and the ground 3 constitute a loop, the capacitor 500 and the voltage stabilizer circuit 30$a$ absorb the electrostatic energy of the positive electrostatic voltage together.

In a fourth stage: if the positive electrostatic voltage is greater than $V_2$ and less than $V_3$, the first diode 60 and the fourth diode 34 are forward biased, The second diode 62 and the third diode 32 are reverse biased. The voltage stabilizing diodes 300$a$ and 300$b$ are biased into reverse breakdown. The capacitor 500 and the voltage stabilizer circuits 30$a$ and 30$b$ absorb the electrostatic energy of the positive electrostatic voltage together.

The working processes of a fifth stage to a nth stage are similar to the previous described stages, the detailed description of the fifth stage to the nth stage is omitted.

If an negative electrostatic voltage inputs to the ESD protection circuit 6 through the input terminal 40, the working process of the ESD protection circuit 6 may include the following steps (the voltage drop of all diodes are ignored for simplification):

In a first stage: if the negative electrostatic voltage is greater than $-(V_1-VCC)$, the first diode 60 and the fourth diode 34 are reverse biased, the second diode 62 and the third diode 32 are forward biased. The negative electrostatic voltage and the power voltage VCC charge the capacitor 500; the capacitor 500 absorbs electrostatic energy of the negative electrostatic voltage.

In a second stage: if the negative electrostatic voltage is greater than $-(V_2-VCC)$ and less than $-(V_1-VCC)$, the first diode 60 and the fourth diode 34 are reverse biased, the second diode 62 and the third diode 32 are forward biased. The voltage stabilizing diode 300a is biased into reverse breakdown. The capacitor 500 and the voltage stabilizer circuit 30a absorb the electrostatic energy of the negative electrostatic voltage together.

In a third stage: if the negative electrostatic voltage is greater than $-(V_3-VCC)$ and less than $-(V_2-VCC)$, the first diode 60 and the fourth diode 34 are reverse biased, the second diode 62 and the third diode 32 are forward biased. The voltage stabilizing diodes 300a and 300b are biased into reverse breakdown. The capacitor 500 and the voltage stabilizer circuits 30a and 30b absorb the electrostatic energy of the negative electrostatic voltage together.

In a fourth stage: if the negative electrostatic voltage is greater than $-(V_4-VCC)$ and less than $-(V_3-VCC)$, the first diode 60 and the fourth diode 34 are reverse biased, the second diode 62 and the third diode 32 are forward biased. The voltage stabilizing diodes 300a, 300b, and 300c are biased into reverse breakdown. The capacitor 500 and the voltage stabilizer circuits 30a, 30b, and 30c absorb the electrostatic energy of the negative electrostatic voltage together.

The working processes of a fifth stage to a nth stage are similar to the previous described stages, the detailed description of the fifth stage to the nth stage is omitted.

Whether the electrostatic voltage is positive or negative, the greater the absolute value of the electrostatic voltage is, the more voltage regulator diodes are biased into reverse breakdown, the electrostatic energy of the electrostatic voltage may be absorbed by the corresponding voltage stabilizer circuits.

Figure 2:
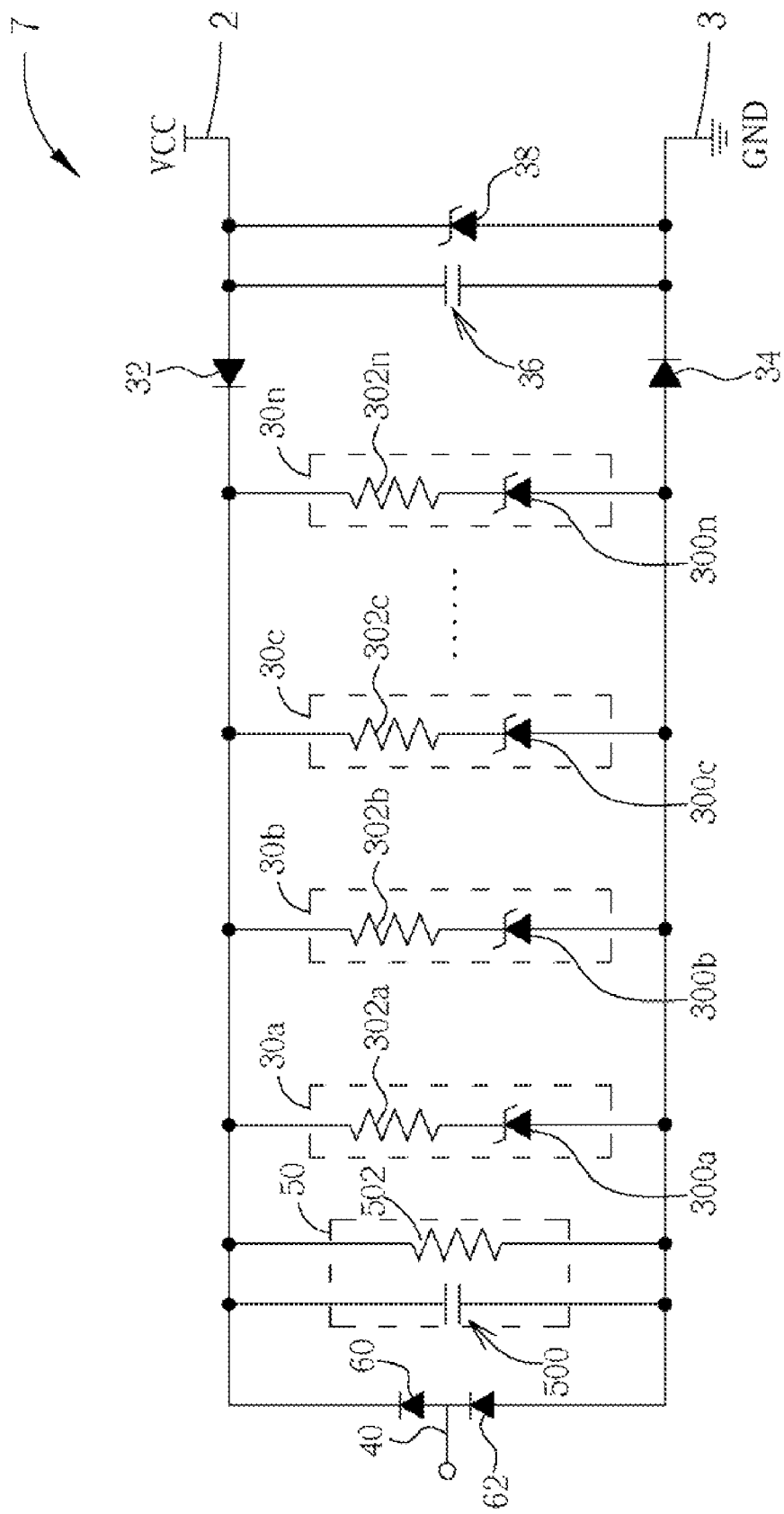
FIG. 2 is a schematic circuit diagram of an ESD protection circuit according to a second embodiment of the present disclosure.

Referring to FIG. 2, an ESD protection circuit 7 according to a second embodiment of the present disclosure is shown. The ESD protection circuit 7 is similar to the above-described ESD protection circuit 6, differing in that a resistor-capacitor circuit (RC circuit) 50 electrically connects with the voltage stabilizer circuits 30i in parallel. The RC circuit 50 includes the capacitor 500 and a parallel discharge resistor 502 with the capacitor 500.

The RC circuit 50 works as follows: if the positive electrostatic voltage is less than VCC, the first diode 60, and the fourth diode 34 are forward biased, the positive electrostatic voltage charges the capacitor 500. When the positive electrostatic voltage is eliminated, the capacitor 500 discharges via the discharge resistor 502. The RC circuit 50 absorbs the electrostatic energy of the positive electrostatic voltage. If the negative electrostatic voltage is greater than $-(V_1-VCC)$, the first diode 60 and the fourth diode 34 are reverse biased, the second diode 62 and the third diode 32 are forward biased. The negative electrostatic voltage and the power voltage VCC charge the capacitor 500. When the negative electrostatic voltage is eliminated, the capacitor 500 discharges via the discharge resistor 502. The RC circuit 50 absorbs the electrostatic energy of the negative electrostatic voltage.

Figure 3:
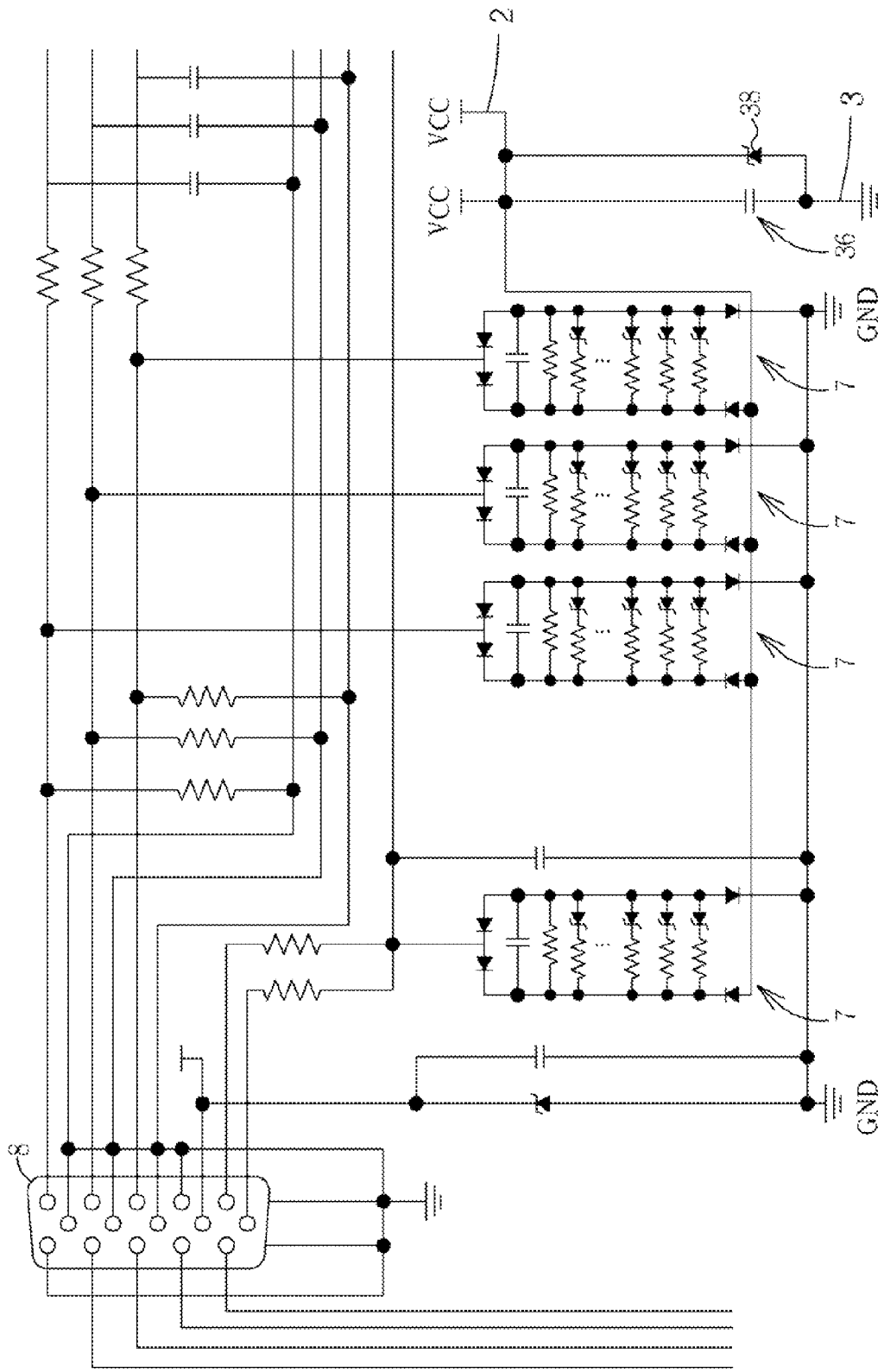
FIG. 3 is a schematic circuit diagram of an electronic device including the ESD protection circuit shown in FIG. 2.
Figure 4:
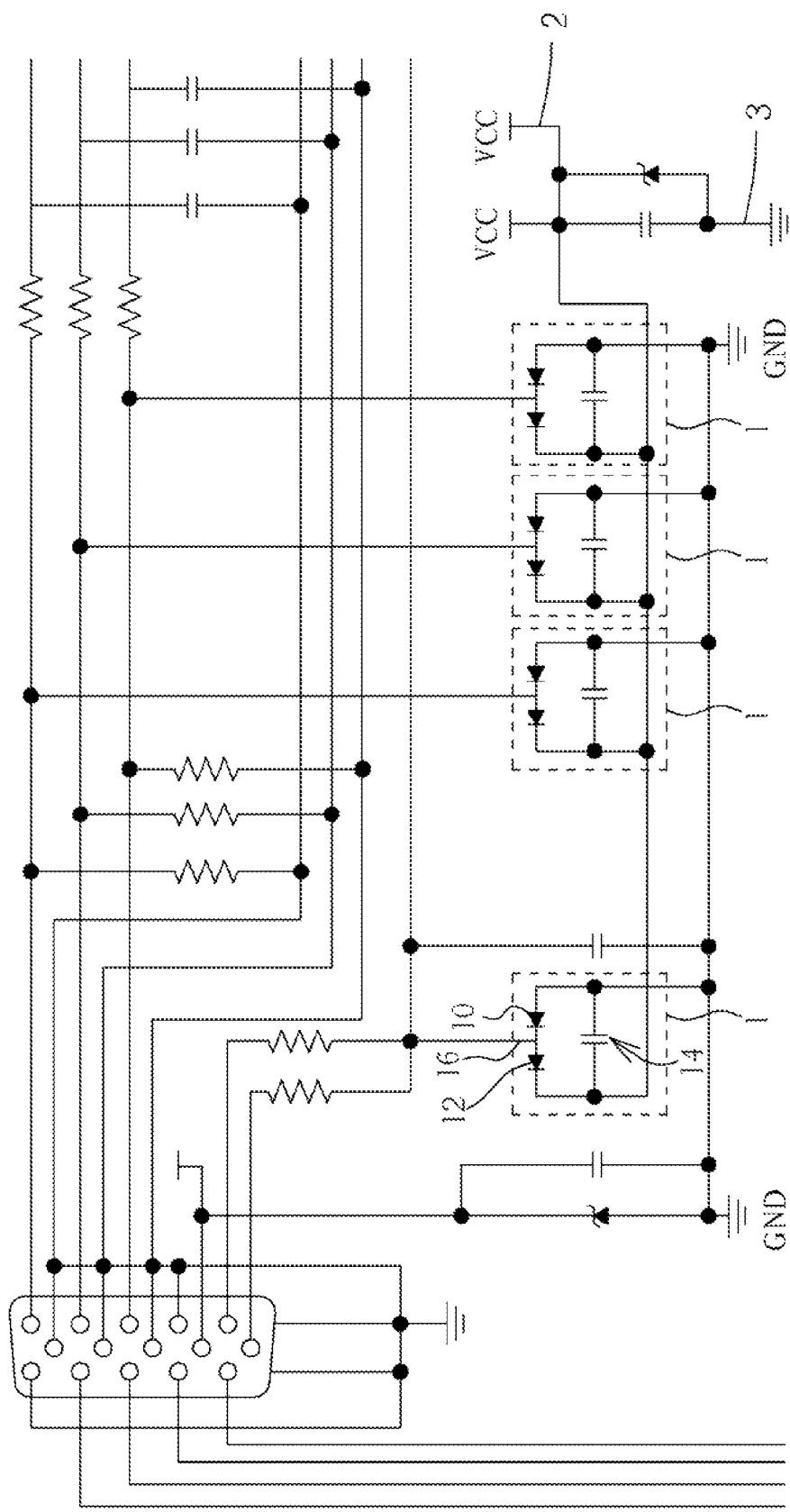
FIG. 4 is a circuit diagram of an electronic device including an ESD protection circuit.

Referring to FIG. 3, an electric device such as LCD includes a signal source 8. The signal source 8 includes a plurality of output terminals, and the output terminal, which needs to eliminate static electricity, connects to the input terminal 40.

In an alternative embodiment of the present disclosure, the resistors 302i (i=1, 2, 3, . . . , n) can be omitted.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electrostatic discharge protection circuit, comprising:
   an input terminal;
   a first diode including an anode and a cathode;
   a second diode including an anode and a cathode;
   a third diode including an anode and a cathode;
   a fourth diode including an anode and a cathode;
   a plurality of voltage stabilizer circuits; and
   a power terminal;
   wherein the input terminal and the cathode of the second diode connect to the anode of the first diode; the plurality of voltage stabilizer circuits connect in parallel between the cathode of the first diode and the anode of the second diode; the power terminal connects to the anode of the third diode, the cathode of the third diode connects to the cathode of the first diode; the cathode of the fourth diode connects to ground, the anode of the fourth diode connects to the anode of the second diode.

2. The electrostatic discharge protection circuit as claimed in claim 1, wherein each voltage stabilizer circuit has a regulated voltage value $V_i$ (i=1, 2, 3 . . . n), and the magnitude relationship of the regulated voltage values $V_1 \sim V_n$ is $V_1 < V_2 < \ldots < V_n$, the voltage value of the power terminal is less than $V_1$.

3. The electrostatic discharge protection circuit as claimed in claim 1, wherein each voltage stabilizer circuit includes a voltage stabilizing diode, an anode of the voltage stabilizing diode connects to the ground through the fourth diode, a cathode of the voltage stabilizing diode connects to the power terminal through the third diode.

4. The electrostatic discharge protection circuit as claimed in claim 3, wherein each voltage stabilizer circuit further includes a resistor connected to the voltage stabilizing diode in series.

5. The electrostatic discharge protection circuit as claimed in claim 3, wherein the electrostatic discharge protection circuit further includes a capacitor connected with the voltage stabilizer circuits in parallel.

6. The electrostatic discharge protection circuit as claimed in claim 5, wherein a resistor connects to the capacitor in parallel.

7. The electrostatic discharge protection circuit as claimed in claim 6, wherein a bypass capacitor and a zener diode electrically connects in parallel between the power terminal and the ground.

8. The electrostatic discharge protection circuit as claimed in claim 3, wherein if an electrostatic voltage inputs in to the electrostatic discharge protection circuit through the input terminal, the greater the absolute value of the electrostatic voltage is, the more voltage regulator diodes are biased into reverse breakdown, the electrostatic energy of the electrostatic voltage is absorbed by the corresponding voltage stabilizer circuits.

9. An electric device, comprising:
a signal source including a plurality of output terminals; and
a plurality of electrostatic discharge protection circuits;
wherein each electrostatic discharge protection circuit includes an input terminal, a first diode, a second diode, a third diode, a fourth diode, a plurality of voltage stabilizer circuits, a power terminal and a ground; the input terminal and the cathode of the second diode connect to the anode of the first diode; the plurality of voltage stabilizer circuits connect in parallel between the cathode of the first diode and the anode of the second diode; the power terminal connects to the anode of the third diode, the cathode of the third diode connects to the cathode of the first diode; the ground connects to the cathode of the fourth diode, the anode of the fourth diode connects to the anode of the second diode; the output terminal which needs to eliminate static electricity connects to the input terminal of one electrostatic discharge protection circuit.

10. The electric device as claimed in claim 9, wherein each voltage stabilizer circuit has a regulated voltage value $V_i$ (i=1, 2, 3 . . . n), and the magnitude relationship of the regulated voltage values $V_1 \sim V_n$ is $V_1 < V_2 < \ldots < V_n$, the voltage value of the power terminal is less than $V_1$.

11. The electric device as claimed in claim 9, wherein each voltage stabilizer circuit includes a voltage stabilizing diode, an anode of the voltage stabilizing diode connects to the ground through the fourth diode, a cathode of the voltage stabilizing diode connects to the power terminal through the third diode.

12. The electric device as claimed in claim 11, wherein each voltage stabilizer circuit further includes a resistor connected to the voltage stabilizing diode in series.

13. The electric device as claimed in claim 11, wherein the electrostatic discharge protection circuit further includes a capacitor connected with the voltage stabilizer circuits in parallel.

14. The electric device as claimed in claim 13, wherein a resistor connects to the capacitor in parallel.

15. The electric device as claimed in claim 14, wherein a bypass capacitor and a zener diode electrically connect in parallel between the power terminal and the ground.

* * * * *